May 17, 1966 J. C. HEWITT, JR., ETAL 3,251,549
ILLUMINATED TEMPERATURE CONTROL DEVICE
Filed July 24, 1962 2 Sheets-Sheet 1

INVENTORS
JOHN C. HEWITT, JR. DECEASED
BY, PATRICIA A. MORRISON ADMINISTRATRIX
MARVIN M. GRAHAM
DAVID T. BRANSCOM

BY FULWIDER, PATTON,
RIEBER, LEE & UTECHT

ATTORNEYS

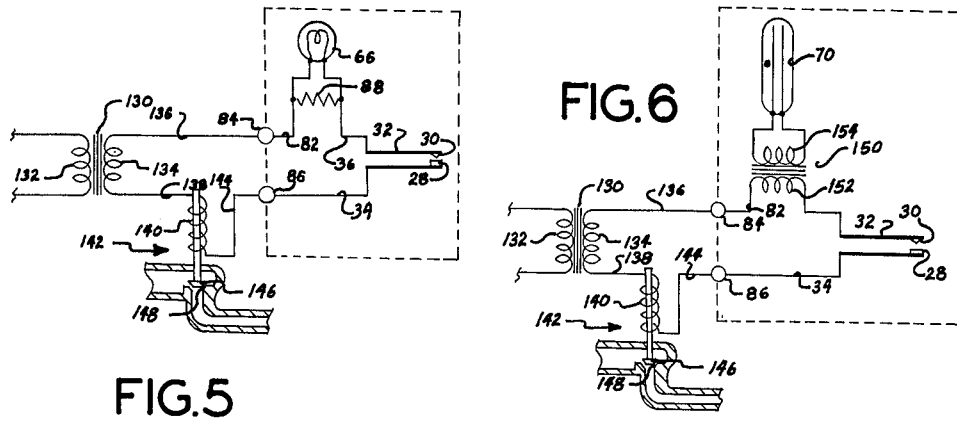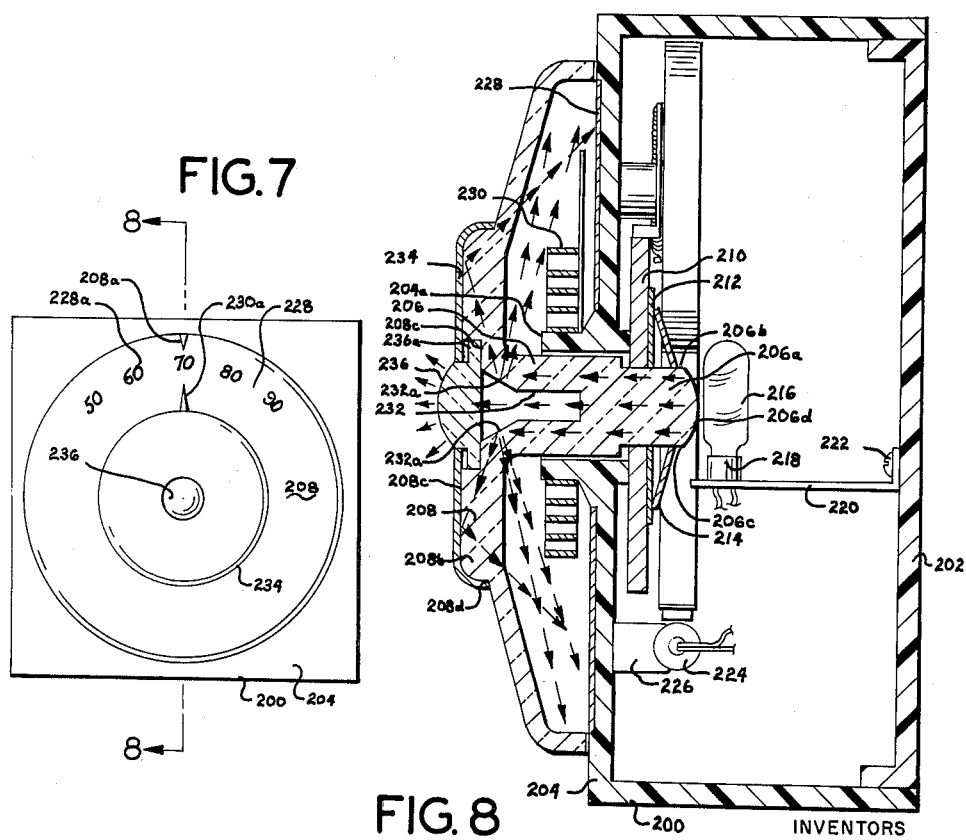

United States Patent Office 3,251,549
Patented May 17, 1966

3,251,549
ILLUMINATED TEMPERATURE CONTROL
DEVICE
John C. Hewitt, Jr., deceased, late of Long Beach, Calif., by Patricia A. Morrison, administratrix, Garden Grove, Calif., and Marvin M. Graham, San Pedro, and David T. Branscom, Long Beach, Calif., assignors to Robertshaw Controls Company, Richmond, Va., a corporation of Delaware
Filed July 24, 1962, Ser. No. 212,169
4 Claims. (Cl. 236—68)

The present invention relates generally to control devices, and more particularly to electrically energizable auxiliary means to cause control devices to effect improved control and indicating functions.

Within the past decade or two automatic equipment of varying design and operation have appeared on the market to assist in performing many of the functions theretofore required to be performed by a human operator. As such, it has become necessary to provide control instrumentalities of equal capability to effect the required control and indicating functions of such equipment.

Control devices in this day of extensive automation must perform many different functions in addition to providing a decorative appearance. Also, it has been discovered that prior control devices have been difficult to read and adjust within a short period of time. For instance, in the domestic heating field control devices, which are usually temperature responsive, are often located in areas which are poorly lighted, making it difficult for a person to determine the operating condition of the heating equipment associated therewith, and to effect the desired adjustment of such equipment.

Due to the fact that control devices for use in the domestic heating field are responsive to temperature variations, any auxiliary means for improving the illumination of such control devices should have a minimum effect on the ambient temperature conditions. That is, such auxiliary illuminating means is generally electrically energizable and is positioned in close proximity to the control device so that the usual heat energy afforded thereby has a marked effect on the sensitivity of the device.

It is an object of the present invention to provide a control device having illuminating means which has no appreciable effect on the operation of the device.

Another object of the present invention is to provide a control device having illuminating means wherein the condition of illumination of the device indicates a control condition thereof.

Another object of the present invention is to provide a control device as characterized above wherein the heat energy produced by the illuminating means is utilized to render the control device more sensitive and accurate.

Another object of the present invention is to provide a thermostatic control device as characterized above wherein the heat energy afforded by the illuminating means is employed to effect anticipation of the response temperature of the device.

Another object of the present invention is to provide a control device as characterized above wherein a plurality of different illuminating devices are employed for indicating various control conditions of the device.

Another object of the present invention is to provide a control device as characterized above wherein there is provided means for more efficiently utilizing the light energy in illuminating a control dial.

A further object of the present invention is to provide a control device having a pair of relatively movable condition responsive electrical contacts, and wherein there is provided a pair of illuminating lamps which are alternatively energized in accordance with operation of the electrical contacts.

A still further object is to provide a control device as characterized above wherein the electrical contacts control the heating apparatus and also constitute the sole control means for alternatively energizing such illuminating lamps.

Another object of the present invention is to provide control devices as characterized above which are simple and inexpensive to manufacture and which are rugged and dependable in operation.

The novel features which we consider characteristic of our invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 5 is a schematic diagram of a second embodiment of the electrical circuitry for the subject control device;

FIGURE 6 is a circuit diagram of a third embodiment of the electrical circuitry for the subject device;

FIGURE 7 is a front elevational view of a control device provided with improved illuminating means; and FIGURE 8 is an enlarged sectional view of the control device of FIGURE 7 taken substantially along line 8—8 thereof.

Like reference characters indicate corresponding parts throughout the several views of the drawings.

Figure 1:
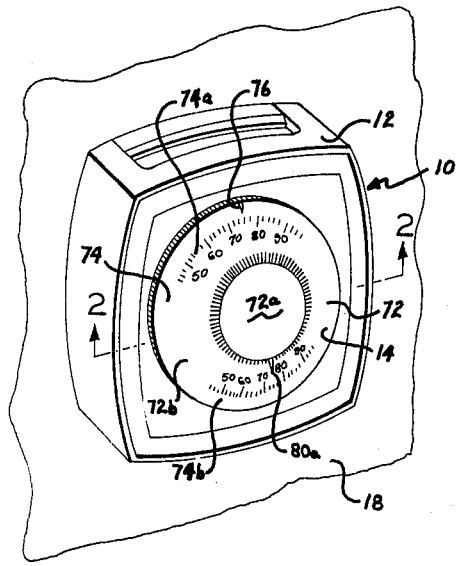
FIGURE 1 is a perspective view of a control device according to the present invention.

Referring to FIGURE 1 of the drawings, there is shown therein a control device 10 having a housing 12 which carries a dial or indicator 14. As shown most clearly in FIGURE 2, housing 12 comprises a base 16 to be fastened to a wall or panel as shown at 18 in FIGURE 1, and a cover 20 which is removably fastened to base 16 and which carries the indicator 14. It is contemplated that housing 12 may be formed of any suitable material as for instance wood or of a material such as metal, plastic or the like which can be formed in a stamping or casting operation.

Within housing 12 and fastened to base 16 is a mounting platform 22 which carries the various components of the condition responsive control means to be hereinafter described.

Figure 3:
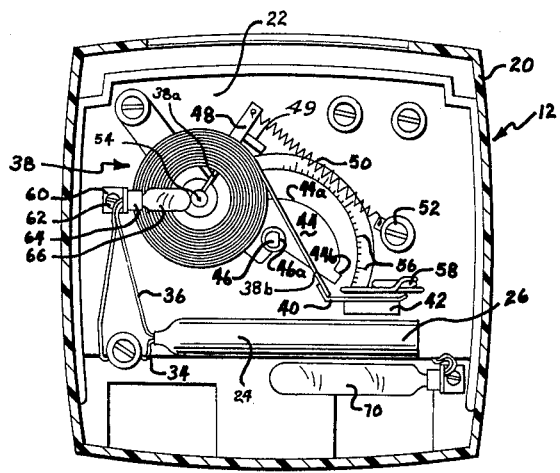
FIGURE 3 is an enlarged sectional view of such device taken substantially along line 3—3 of FIGURE 2.
Figure 4:
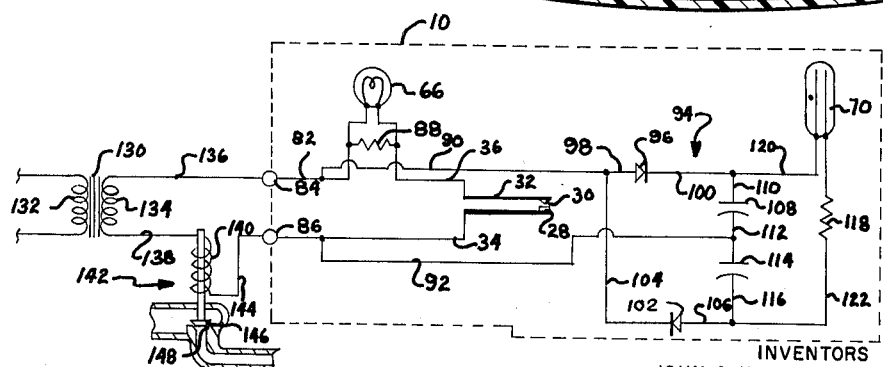
FIGURE 4 is a schematic diagram of the electrical circuitry for the control device of FIGURE 3.

Referring to FIGURE 3 of the drawings, a circuit controlling device 24 in the form of a pair of encapsulated electrical contacts is provided for controlling an electrical circuit. Device 24 comprises a generally tubular envelope 26 the opposite ends of which are hermetically sealed, and wherein are positioned for relative movement a pair of electrical contacts 28 and 30 as shown in FIGURE 4. One of such contacts is mounted in a relatively stationary position within the envelope 26, and hence is referred to as the stationary contact. The stationary contact is shown diagrammatically in FIGURES 4, 5 and 6 of the drawings and is identified with the reference character 28.

For movement into and out of engagement with stationary contact 28, there is also provided within envelope 26 a movable contact 30 (FIGURES 4, 5 and 6) which is carried by a contactor 32 which may be formed of magnetic material or which may be provided with a magnetic armature member as desired. In either event, contactor 32 functions as a magnetic armature as will hereinafter appear. A pair of lead wires 34 and 36 extend from the hermetically sealed envelope 26 and are connected in circuit with the relatively movable contacts 28 and 30.

For actuating the electrical contacts of device 24, there is provided within housing 12 a condition responsive actuator in the form of a bimetallic element 38 which is formed with a series of convolutions as shown in FIGURE 3 of the drawings. Bimetallic element 38 comprises a pair of juxtaposed metallic strips having dissimilar coefficients of thermal expansion. Thus, the convolutions of element 38 expand and contract with changes in temperature due to the difference in the expansion and contraction of the individual metallic strips.

The innermost convolution of temperature responsive element 38 is adjustably mounted on platform 22 as shown at 38a. The outermost convolution of element 38 terminates in a straight movable end portion 38b. Thus, as the convolutions of the bimetallic element 38 expand and contract, the outer end 38b thereof is caused to move accordingly. Attached to said end portion 38b is a mounting bracket 40 which carries a permanent magnet 42. Thus as element 38 responds to temperature changes, the permanent magnet 42 is moved accordingly with respect to the circuit controlling device 24. As will hereinafter be explained in greater detail, as the element 38 moves permanent magnet 42 toward the envelope 26, a point is reached where the permanent magnet 24 attracts the armature-contactor 32 so as to move the movable contact 32 to a given position with respect to stationary contact 28. Upon movement of the permanent magnet 42 in the opposite direction, a point is reached where such movable contact 30 is permitted to return to its other position relative to stationary contact 32, usually under the influence of an appropriate biasing spring (not shown).

In order to effect adjustment of the response temperature of the bimetallic element 38, a cam member 44 is pivotally mounted on platform 22 by means of a pivot pin or shaft 46. Cam member 44 is provided with a cam surface 44a which acts to pivot a pivotal lever 48 through a lateral extension 49 of the lever 48. A tension spring 50 one end of which is attached to pivotal lever 48 and the other end of which is anchored to mounting platform 22 as at 52 is provided to urge pivotal lever 48 into contact with cam surface 44a of cam member 44.

Pivotal lever 48 is firmly connected to a pivot pin 54 which carries the stationary end portion 38a of bimetallic element 38. Thus, as pivotal lever 48 is caused to rotate under the influence of cam member 44 or the tension spring 50 in opposition thereto, the stationary end 38a of element 38 is repositioned accordingly. As will be recognized by those persons skilled in the art, such movement of pivotal lever 48 alters the relationship between permanent magnet 42 and circuit controlling device 24 to thereby change the response temperature of the circuit controlling device.

To facilitate the foregoing adjustment of the response temperature, suitable graduations as shown at 56 may be provided for cooperation with an indicator 44b formed in cam member 44. The graduations 56 may or may not be identified with temperature values as desired.

A limit stop 58 is provided on mounting platform 22 to limit the movement of permanent magnet 42 away from circuit controlling device 24.

Mounted in heat conducting relation to bimetallic element 38, as by means of an L-shaped bracket 60 one end of which is fastened to mounting platform 22 by a screw 62, is a lamp socket 64 which carries a filament lamp 66. For reasons which will hereinafter be explained in detail, lamp 66 may be of substantially any construction which will afford both heat energy and light energy.

That is, lamp 66 should function as an illuminating device and as a heating member as will hereinafter be explained. Filament lamps which produce light energy as a result of electrical current flow through a high resistance filament inherently produce heat energy due to the usual $I^2R$ losses.

Also positioned within housing 12 of control device 10 but removed from bimetallic element 38 is a second illuminating lamp 70 which is of the gas filled type wherein the light energy is produced by the arcing of electrical energy across a predetermined gaseous gap. Such lamp may be provided with a neon gas fill in which event substantially all of the electrical energy is converted to light energy. As will hereinafter be explained in greater detail, neon filled lamps generally require 65 to 70 volts for proper operation. Although it has been found desirable to use a neon-filled lamp 70, it is realized that lamps having other gaseous fills can be employed within the spirit of the present invention.

Rotatably mounted on cover 20 of housing 12 is an inverted cup-shaped adjustment dial 72 having an opaque central portion 72a and a transparent peripheral portion 72b. Between the transparent portion 72b of adjustment member 72 and the cover 20 there is provided a dial member 74 on which is provided suitable temperature indicia in the form of temperature graduations. Although not mandatory for successful practice of the instant invention, there may be provided an upper scale 74a and a lower scale 74b for substantially the same range of temperatures. The upper scale 74a is for use in adjusting the response temperature of the subject device whereas the lower scale 74b indicates the existing temperature condition.

For cooperation with the upper scale 74a of dial 74, an indicator 76 is provided on adjusting member 72. To facilitate manual rotation of adjustment member 72, the outer peripheral edge 72c may be formed with serrations or knurling if desired.

Adjustment member 72 is formed with a stem 78 which extends through a suitable opening in cover member 20. A temperature responsive element 80 may be positioned about stem 78 for cooperation with the lower scale 74b of dial 74, and may take substantially any desired form, as for instance the bimetallic construction as above explained with respect to element 38. Element 80 is provided with an indicating end portion 80a for cooperation with scale 74b for indicating ambient temperature conditions.

Pivotal stem 78 of adjustment member 72 extends into housing 12 for non-rotatable engagement with stem 46 of cam member 44. To accomplish this, stem 46 is formed with a flat surface 46a. The lower end of pivotal stem 78 is formed with a complementally shaped opening for receiving stem 46. That is, the opening within the lower end portion of stem 78 is formed with a flat surface for engagement with the flat surface 46a of stem 46 whereby after cover member 20 is assembled on base member 16 rotation of adjustment member 72 causes cam member 44 to be rotated accordingly.

Referring to FIGURE 4 of the drawings, there is shown therein a schematic diagram of the electrical circuitry of the control device 10, and the connection of such circuits to devices to be controlled thereby. The filament lamp 66 is shown connected in series circuit arrangement with the electrical contacts 28 and 30 of the circuit controlling device 24. To accomplish this, the aforementioned lead wire 36 extends from one side of lamp 66 to the armature-contactor 32. The other side of filament lamp 66 is connected to a lead wire 82 one end of which is connected to a terminal as indicated at 84 in FIGURE 4. The lead wire 34 as shown in FIGURE 3, extends from the stationary contact 28 of device 24 to a terminal member 86.

An electrical resistance element 88 may be connected in parallel with lamp 66 as shown in FIGURE 4, to control the flow of current through the latter.

The energizing circuit for lamp 70 is connected in parallel circuit arrangement with the series circuit consisting of lamp 66 and circuit controlling device 24. To effectuate this the energizing circuit for lamp 70 comprises a lead wire 90 one end of which is connected to the lead wire 82, and a lead wire 92 one end of which is connected to the lead wire 34. Connected to the other ends of lead wires 90 and 92 is a voltage multiplier 94.

Since control devices for domestic heating apparatus are usually constructed for operation with 24 volts alternating current, it is necessary to employ means to increase this voltage to approximately 65–70 volts for proper operation of lamp 70.

The voltage multiplier 94 comprises a unidirectional impedance device or rectifier 96 one side of which is connected to lead wire 90 by a lead wire 98, and the other side of which is connected to a lead wire 100. A second unidirectional impedance device 102 is also included in the multiplier circuit, one end of device 102 being connected by means of a lead wire 104 to the juncture of lead wires 90 and 98. The other side of device 102 is connected to a lead wire 106. Connected between the lead wires 100 and 106 is a circuit comprising a capacitor 108 one side of which is connected to a lead wire 110 which is connected to lead wire 100, and the other side of which is connected to a lead wire 112. The other end of lead wire 112 is connected to a second capacitor 114 which is connected to lead wire 106 by a lead wire 116. The lead wire 92 is connected directly to lead wire 112 as shown in FIGURE 4 of the drawings.

Connected across the serially arranged capacitors 108 and 114 is a series circuit comprising lamp 70 and a current limiting resistor 118. A lead wire 120 connects one side of lamp 70 to the juncture of lead wires 100 and 110 while a lead wire 122 connects one side of resistor 118 to the juncture of lead wires 106 and 116.

Figure 2:
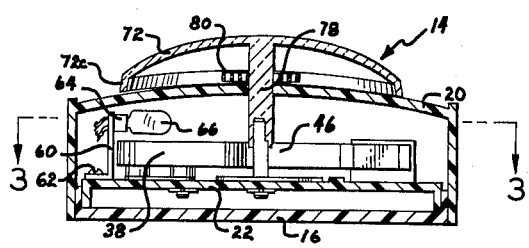
FIGURE 2 is a sectional view of the control device of FIGURE 1 taken substantially along line 2—2 thereof.

Although not shown in detail in FIGURES 1, 2 and 3 of the drawings, the electrical circuitry within the broken line 10 of FIGURE 4 is within the housing 12 of the aforedescribed control device.

The source of power for operating the control devices of domestic heating equipment comprises the usual source of household electrical power. The electrical potential of such source is on the order of 110 volts. Thus, in order to provide the desired 24 volts, a transformer 130 is provided having a primary winding 132 connected directly to the 110 volt source. The secondary winding 134 of transformer 130 is formed with the requisite number of turns of wire of proper size to provide the desired 24 volt potential.

One side of secondary winding 134 is connected to terminal 84 of control device 10 by means of a lead wire 136. The other side of winding 134 is connected by means of a lead wire 138 to one side of an operating coil or winding 140 of a solenoid valve 142. The other side of winding 140 is connected by means of a lead wire 144 to terminal 86 of the control device 10. Solenoid valve 142 operates to control the flow of combustible fuel from a suitable source thereof (not shown) to the heating equipment (not shown), and comprises a valve member 146 which is biased into engagement with a valve seat 148 in the valve body, there being an armature connected to valve member 146 to be moved by the electromagnetic flux generated by winding 140 as will hereinafter appear in greater detail.

The control device 10 operates generally as follows with respect to the solenoid valve 142 and the associated heating equipment.

With 110 volts impressed across the primary winding 132 of transformer 130, 24 volts is developed across the secondary winding 134 thereof. As long as electrical contacts 28 and 30 are in separated relation the valve member 146 will remain in engagement with valve seat 148, thereby preventing operation of the heating equipment. However, as the ambient temperature to which bimetallic element 38 is exposed decreases the convolutions of element 38 deform to a point where the permanent magnet 42 causes movable contact 30 to engage stationary contact 28. When this happens, a circuit is completed from secondary winding 134 to winding 140 of solenoid valve 142 through the filament lamp 66. Electrical current thus flows from winding 134 through lead wire 136, lead wire 82, lamp 66 and resistor 88, lead wire 36, armature 32, contacts 30 and 28, lead wire 34, lead wire 144, winding 140 and lead wire 138.

Such current flow causes several functions to take place. Firstly, energization of winding 140 causes valve member 146 to be removed from seating engagement with valve seat 148 in the valve body. This permits combustible fuel to flow to the main burner of the heating equipment so as to be ignited by the pilot burner threat for effecting heating operation. As will be readily understood, the control device 10 is positioned within the space being heated by such heating equipment.

The second function which takes place upon closure of electrical contacts 28 and 30 results from energization of filament lamp 66. The light energy afforded by lamp 66 serves to illuminate the dial 74 on the exterior surface of cover 20 through suitable openings in the housing of the control device. Such illumination, in addition to facilitating reading of the temperature scales 74a and 74b of dial 74 also indicates that the equipment is performing its heating operation.

As above explained, due to the fact that lamp 66 is provided with a filament, a predetermined amount of heat is afforded thereby. Such heat is exposed to the bimetallic element 38 due to the relative positions of lamp 66 and element 38. Thus as the heating equipment is heating the space wherein the control device 10 is located, the lamp 66 is supplying artificial heat to element 38. The bimetallic element 38 is thus being heated at a faster rate than would result merely from normal operation of the heating equipment. As such, the bimetallic element is caused to respond quicker to interrupt the heating cycle of the heating unit. The fact that the heating cycle is terminated or interrupted quicker minimizes or eliminates the usual overshooting that normal control systems permit. Thus the temperature fluctuations within the space being heated are kept to a minimum.

Upon opening of the electrical contacts 28 and 30, the electromagnetic winding 140 of valve 142 is de-energized so as to permit valve member 146 to return to its flow preventing position. This, of course, terminates the heating cycle of the associated heating equipment.

Opening of contacts 28 and 30 also de-energizes filament lamp 66 thereby terminating both the heat anticipation for bimetallic element 38 as above-described and also the illumination function thereof. The primary result of the latter function is that a visual indication is thereby provided that the heating cycle has been terminated.

Such opening movement of movable contact 30 with respect to stationary contact 28 also effects energization of the gas filled lamp 70. The energizing circuit for lamp 70 is constantly connected across the source of power afforded by secondary winding 134 of transformer 130. However, whenever the contacts 28 and 30 are closed a shunt circuit is provided across the multiplier 94 due to the parallel circuit arrangement thereof. Since the series circuit comprising lamp 66 and circuit controlling device 24 offers considerably less resistance to the flow of electrical current, only a negligible amount of current is caused to flow to the multiplier 94 whenever contacts 28 and 30 are closed.

When device 24 is in its open circuit condition, however, the energizing circuit for lamp 70 is the only circuit then connected across secondary winding 134. Since multiplier 94 is of relatively high electrical resistance, insufficient current is permitted to flow through winding 140 for operation of solenoid valve 142. Thus valve 142 remains in its flow preventing position.

The 24 volts developed across secondary winding 134 varies from a maximum positive potential to a maximum negative potential. As such, the unidirectional impedance devices 96 and 102 are caused to alternately permit current flow so as to charge the capacitors 106 and 114. That is, during one-half of the cycle, current is permitted to flow from secondary winding 134 through lead wires 136, 82, 90 and 98, rectifier 96, lead wires 100 and 110 to the upper plate of capacitor 108, and from the lower plate of said capacitor through lead wires 112, 92, 34 and 144, winding 140 and lead wire 38. Thus, capacitor 108 is charged to a given value with a predetermined polarity. At the time that rectifier 96 is passing electrical current, rectifier 102 is preventing charging of the capacitor 114 due to the position of rectifier 102 in the circuit. That is, current cannot flow through rectifier 102 from lead wire 104 to lead wire 106 due to the unidirectional impedance characteristic of device 102.

On the other half of the alternating current cycle, current is caused to flow from secondary winding 134 through lead wire 138, winding 104, lead wires 144, 34, 92 and 112 to the upper plate of capacitor 114, and from the lower plate of said capacitor through lead wires 116 and 106, rectifier 102, and lead wires 104, 90, 82 and 136. Thus capacitor 114 is charged.

The peak voltage of a 24 volt alternating current supply is approximately 33.6 volts. Thus it is possible for each of the capacitors 108 and 114 to be separately charged to a voltage of 33.6 volts. Since they are arranged in series with their polarities additive, it is seen that the total voltage across the two capacitors can reach approximately 67.2 volts. This is sufficient to ignite neon lamp 70, to cause current to flow through said lamp and through the current limiting resistor 118.

It is thus seen that upon opening of the electrical contacts 28 and 30, the neon lamp 70 is energized to afford illumination of dial 74 for easy viewing of the latter from a substantial distance. Also, the light afforded by lamp 70 is noticeably different from that afforded by filament lamp 66 to thereby afford indication that the heating equipment is in the non-heating portion of its cycle. As such, the lamps 66 and 70 cooperate to effect continuous illumination of dial 74 and to clearly indicate, at a glance, the operating condition of the heating equipment.

Due to the placement of lamp 70 within housing 12 of device 10, what little heat energy is afforded thereby has no appreciable effect on the response of bimetallic element 38.

FIGURES 5 and 6 of the drawings show alternative electric circuits for use in device 10. FIGURE 5 shows the use of only filament lamp 66 as an illuminating element, indicating element and heat anticipator. FIGURE 6, on the other hand, shows the use of a gas filled lamp for both illuminating and indicating purposes.

The device of FIGURE 5 is similar to the circuitry shown in FIGURE 4 except that it does not include lamp 70 and its associated circuitry. The lamp 66 is under control of the electrical contacts 28 and 30 of device 24. Thus, energization of lamp 66 will illuminate the dial 74, afford indication of the fact that the heating unit is in operation, and depending upon the position of lamp 66 within housing 12, will afford heat anticipation for the operation of bimetallic element 38 as above-explained.

FIGURE 6 shows the use of a transformer 150 having a primary winding 152 in circuit with device 24 and solenoid valve 124, and a secondary winding 154 connected directly to lamp 70. As such, transformer 150 increases the potential from secondary winding 134 sufficiently to effect ignition of lamp 70. It is thus seen that energization of lamp 70 indicates that the heating equipment is in operation and also affords illumination of the dial 74. Due to the negligible amount of heat energy afforded by lamp 70, negligible heat anticipation results.

FIGURES 7 and 8 show a further embodiment of a control device provided with illuminating means. Such device comprises a housing 200 having a base member 202 on which is mounted a cup-shaped cover member 204. Cover member 204 is formed with a central opening 204a for receiving the stem of a rotatable adjustment member 208. Adjustment member 208 is similar in construction to adjustment member 72 of the above-described first embodiment of this invention.

The end portion of pivotal stem 206 is provided with a pair of oppositely disposed flat surfaces 206b and 206c for non-rotatably receiving suitable actuating members such as a cam member 210. Cam member 210 is provided with an opening for mating engagement with the end of stem 206. A washer 212 is also positioned on the stem 206 and a snap-on fastening member 214 is urged against washer 212 to hold the cam 210 in assembled relation. The cam member 210 may be utilized for adjusting the response temperature of a bimetallic element such as shown at 38 in the above-explained first embodiment.

One or more illuminating lamps may be operatively positioned within the housing 200 as also explained above with respect to the first embodiment. A lamp 216 is shown positioned within a lamp socket 218, the latter being attached to an L-shaped mounting bracket 220. A mounting screw 222 secures bracket 220 to the base member 202.

A second lamp as shown at 224 may be utilized in the control device, and may be mounted in a predetermined position by a bracket 226. Lamp 224 may take substantially any desired form such as the gas filled lamp 70 of the above-described first embodiment. The electrical circuitry for the energization of lamps 216 and 224 may take substantially any desired form as for instance the circuitry explained hereinabove.

Mounted on cover member 204 is a dial 228 which is provided with a temperature scale as shown at 228a. For cooperation with scale 228a there is provided on adjustment member 208, an indicating point 208a which may be painted on or etched in member 208.

It may be found desirable to provide a temperature indicating device 230 on the cover 204 for indicating existing temperature conditions. Such temperature indicating device may take the form of a bimetallic element as explained in detail with respect to the first embodiment, and may include an indicating point 230a for cooperation with the temperature scale 228a.

Pivot stem 206 and adjustment member 208 may be formed integrally of plastic material which is a good conductor of light energy. As such, the light rays within housing 200 will ultimately be received by the transparent stem 206 for transmission toward the adjustment member 208. To facilitate this, the end portion 206a of stem 206 is provided with a convex surface 206d for enhancing the absorbing qualities of the stem 206 of random light rays within the housing 200.

The opposite end of stem 206 is provided with an opening 232 having a tapered or beveled side wall as at 232a. As such, the light rays absorbed by the stem 206 are deflected radially outwardly by the beveled surface 232a. This is desirable, of course, since the temperature scale 228a is arranged on dial member 228 radially outwardly from the axis of rotation of stem 226.

To assist in concentrating the light rays on the peripheral portions of dial 228, the central portion 208b of adjustment member 208 is provided with a flat exterior surface 208c having a circular peripheral edge 208d. A reflector 234 formed of flexible material is fitted over the central portion 208b of adjustment member 208 by resiliently engaging the circular peripheral edge thereof. The inner surface of member 234 may be polished so as to effectively reflect the light rays toward the peripheral edge of the dial 228.

To enhance the appearance of the control device it may be found desirable to insert a jewel 236 in the center of the adjustment member 208. Jewel 236 may be formed with a peripheral annular flange 236a for use in holding the jewel within a suitably formed cavity 208e within the central portion 208b of adjustment member 208. The jewel 236 may be held in such position by the snap-on reflector 234 in engagement with the annular flange 236a.

It is thus seen that the device of FIGURES 7 and 8 affords a means for efficiently illuminating the dial of a control device. Also, an attractive appearance is afforded by the reflector 234 and the jewel 236, the reflector effectively covering the operating components of the adjustable control device.

The present invention thus affords means for illuminating a control device, which illuminating means performs the additional functions of indicating the existing control condition and, in some circumstances, anticipation of the response condition of the control device.

Although we have shown and described certain specific embodiments of our invention we are fully aware that many modifications thereof are possible. Our invention, therefore, is not to be restricted except insofar as is necessitated by the prior art and by the spirit of the appended claims.

We claim:

1. A control system comprising, in combination:
    a housing defining an internal space;
    an indicator dial carried by said housing; and
    temperature-responsive control means in said space comprising a pair of electrical contacts, an ambient temperature-sensing actuator operable to actuate said contacts between open and closed circuit positions in response to predetermined levels of ambient temperature, a filament lamp in said space in heating relation to said temperature-sensing actuator and under control of said contacts and energized when said contacts are closed, and a vapor lamp in said space and also under control of said contacts and energized when said contacts are open, whereby said lamps are alternately energizable in accordance with both ambient temperature and the temperature afforded by said filament lamp, both said filament lamp and said vapor lamp being juxtaposed with respect to said indicator dial whereby said indicator dial is illuminated irrespective of whether said contacts are open or closed.

2. A control system for heating apparatus and comprising, in combination:
    an electroresponsive control device for said apparatus and energizable to cause said apparatus to effect heating, and deenergizable to interrupt such heating;
    a housing defining an internal space;
    temperature-responsive circuit controlling means in said space in circuit with said control device and adjustably responsive to variations in temperature of the space to be heated by said apparatus to energize said control device in response to a predetermined minimum temperature in said space and to deenergize said control device in response to a predetermined maximum temperature therein;
    an adjustable indicator carried by said housing and coupled to said circuit controlling means for adjusting said circuit controlling means for response to different minimum and maximum temperatures;
    a filament lamp in said space in heating relation to said temperature-responsive circuit controlling means and under control thereof to afford anticipation of the heat afforded by said apparatus; and
    a vapor lamp in said space and also under control of said circuit controlling means to be energized when said filament lamp is deenergized, said filament lamp and said vapor lamp being arranged to illuminate said indicator whereby said lamps afford a visual indication of the condition of said heating apparatus and anticipation of the heating effect thereof to prevent overshooting of said predetermined maximum temperature, and whereby said lamps facilitate adjustment of said circuit controlling means by said indicator.

3. A control system for heating apparatus and comprising, in combination:
    an electroresponsive control device for said apparatus and energizable to cause said apparatus to effect heating, and deenergizable to interrupt such heating;
    a housing defining an internal space;
    temperature-responsive circuit controlling means in said space in circuit with said control device and adjustably responsive to variations in temperature of the space to be heated by said apparatus to energize said control device in response to a predetermined minimum temperature in said space and to deenergize said control device in response to a predetermined maximum temperature therein;
    an adjustable indicator carried by said housing and coupled to said circuit controlling means for adjusting said circuit controlling means for response to different minimum and maximum temperatures;
    a filament lamp in said space in heating relation to said temperature-responsive circuit controlling means and in series circuit arrangement therewith to afford anticipation of the heat afforded by said apparatus; and
    a vapor lamp in said space and in a circuit connected in parallel with said filament lamp and said circuit controlling means for energization when said filament lamp is deenergized, said filament lamp and said vapor lamp being arranged to illuminate said indicator whereby said lamps afford a visual indication of the condition of said heating apparatus and anticipation of the heating effect thereof to prevent overshooting of said predetermined maximum temperature, and whereby said lamps facilitate adjustment of said circuit controlling means by said indicator.

4. A control system for heating apparatus and comprising, in combination:
    an electroresponsive control device for said apparatus and energizable to cause said apparatus to effect heating, and deenergizable to interrupt such heating;
    a housing defining an internal space;
    temperature-responsive circuit controlling means in said space in circuit with said control device and adjustably responsive to variations in temperature of the space to be heated by said apparatus to energize said control device in response to a predetermined minimum temperature in said space and to deenergize said control device in response to a predetermined maximum temperature therein;
    an adjustable indicator carried by said housing and coupled to said circuit controlling means for adjusting said circuit controlling means for response to different minimum and maximum temperatures;
    a filament lamp in said space in heating relation to said temperature-responsive circuit controlling means and in series circuit arrangement with said circuit controlling means to afford anticipation of the heat afforded by said apparatus;
    a vapor lamp in said space and in a circuit connected in parallel with said filament lamp and said circuit controlling means for energization when said filament lamp is deenergized, said filament lamp and said vapor lamp being arranged to illuminate said indicator whereby said lamps afford a visual indication of the condition of said heating apparatus and anticipation of said heating effect thereof to prevent overshooting of said predetermined maximum temperature, and whereby said lamps facilitate adjustment of said circuit controlling means by said indicator; and a voltage multiplier circuit including input leads connected across said filament lamp and said circuit controlling means for providing increased voltage for energization of said vapor lamp.

References Cited by the Examiner

UNITED STATES PATENTS

| | | | |
|---|---|---|---|
| Re. 21,038 | 3/1939 | Leins | 200—138.1 |
| 1,583,496 | 5/1926 | Shafer | 238—68 |
| 1,818,546 | 8/1931 | Evans | 200—122 |
| 1,829,944 | 11/1931 | Raney | 200—139 |
| 1,876,636 | 9/1932 | Dicke | 236—68 X |
| 1,883,251 | 10/1932 | Spencer et al. | 236—68 |
| 1,939,774 | 12/1933 | Hofferbert | 240—2.1 |
| 2,448,776 | 9/1948 | Crise | 236—68 X |
| 2,548,424 | 4/1951 | Dicke | 236—9 |
| 2,636,959 | 4/1953 | Huck | 200—167 X |
| 2,680,803 | 6/1954 | Kiley | 240—2.1 |
| 2,753,548 | 7/1956 | Gates | 340—227 |
| 2,983,804 | 5/1961 | Thomas | 200—122 X |

ALDEN D. STEWART, *Primary Examiner.*

WILLIAM F. O'DEA, *Examiner.*